United States Patent
De Wergifosse et al.

(10) Patent No.: US 11,815,034 B2
(45) Date of Patent: Nov. 14, 2023

(54) CIRCUIT FOR SUPPLYING FUEL TO A TURBOMACHINE

(71) Applicant: SAFRAN AIRCRAFT ENGINES, Paris (FR)

(72) Inventors: Huguette De Wergifosse, Moissy-Cramayel (FR); Loïc Pora, Moissy-Cramayel (FR); Eric De Wergifosse, Blagnac (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1146 days.

(21) Appl. No.: 16/481,009

(22) PCT Filed: Jan. 30, 2018

(86) PCT No.: PCT/FR2018/050203
§ 371 (c)(1),
(2) Date: Jul. 25, 2019

(87) PCT Pub. No.: WO2018/138456
PCT Pub. Date: Aug. 2, 2018

(65) Prior Publication Data
US 2019/0390606 A1 Dec. 26, 2019

(30) Foreign Application Priority Data
Jan. 30, 2017 (FR) ...................................... 1750748

(51) Int. Cl.
*F02C 9/30* (2006.01)
*F02C 7/22* (2006.01)

(52) U.S. Cl.
CPC . *F02C 9/30* (2013.01); *F02C 7/22* (2013.01)

(58) Field of Classification Search
CPC .. F02C 7/232; F02C 7/236; F02C 7/32; F02C 9/30; F05D 2260/40311; F05D 2270/02; F05D 2270/3013; F05D 2270/3061
See application file for complete search history.

(56) References Cited

U.S. PATENT DOCUMENTS

| | | | |
|---|---|---|---|
| 5,813,611 A * | 9/1998 | Cires ...................... | F02K 1/004 239/265.37 |
| 2005/0013706 A1* | 1/2005 | Jansen ................ | F04B 11/0066 417/413.1 |

(Continued)

FOREIGN PATENT DOCUMENTS

| | | |
|---|---|---|
| EP | 1 344 917 A2 | 9/2003 |
| FR | 2 685 735 A1 | 7/1993 |
| FR | 2 934 321 A1 | 1/2010 |

OTHER PUBLICATIONS

Wikipedia "Modular Programming" (Year: 2016).*

(Continued)

*Primary Examiner* — Arun Goyal
*Assistant Examiner* — William L Breazeal
(74) *Attorney, Agent, or Firm* — Christensen O'Connor Johnson Kindness PLLC

(57) ABSTRACT

The present disclosure relates to a system for supplying fuel to a turbomachine. In some embodiments, the system includes a pump, a hydromechanical group, a drive device positioned to drive the pump, and a branch comprising actuators for controlling variable geometry. In some embodiments, the system regulates a fuel flow rate based at least in part on a flow rate set point value. In some embodiments, the system may include a flow rate sensor. A flow rate loop may be arranged to determine a pressure set point value at the outlet of the pump according to the flow rate set point value and a measurement supplied by the flow rate sensor. In some embodiments, a pressure sensor may be positioned (Continued)

in the fuel circuit at the outlet of the pump. In further embodiments, a pressure loop may control the speed of the drive device based at least on a difference between a pressure measurement supplied by the pressure sensor and the pressure set point value.

13 Claims, 6 Drawing Sheets

(56) References Cited

U.S. PATENT DOCUMENTS

| | | | |
|---|---|---|---|
| 2006/0225431 A1* | 10/2006 | Kupratis | F01D 15/10 60/39.24 |
| 2007/0130911 A1 | 6/2007 | Goldberg et al. | |
| 2010/0018182 A1* | 1/2010 | Bader | F02C 7/32 318/400.01 |
| 2013/0291514 A1* | 11/2013 | Suciu | F02C 7/12 60/39.08 |
| 2016/0061053 A1* | 3/2016 | Thomassin | F01D 17/06 415/69 |
| 2016/0186670 A1* | 6/2016 | Oba | F02C 9/263 417/15 |

OTHER PUBLICATIONS

Robotics Stack Exchange "How do I calculate the required loop frequency for a servo controller" (Year: 2015).*
International Search Report dated May 16, 2018, issued in corresponding International Application Mo. PCT/FR2018/050203, filed Jan. 30, 2018, 6 pages.

* cited by examiner

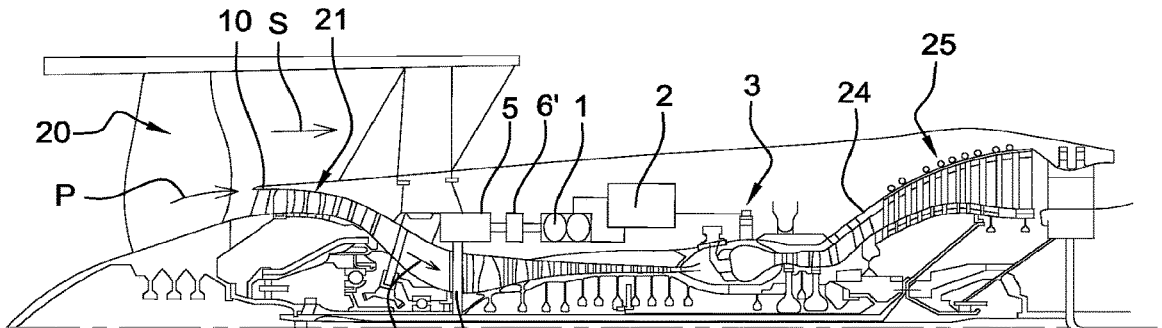
Fig. 3
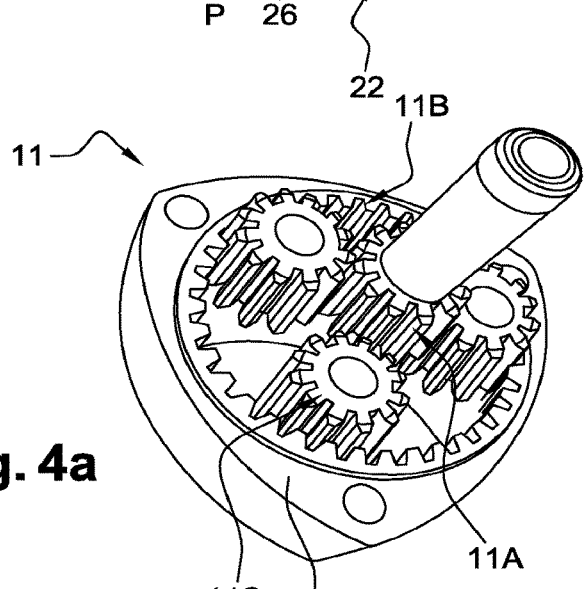
Fig. 4a
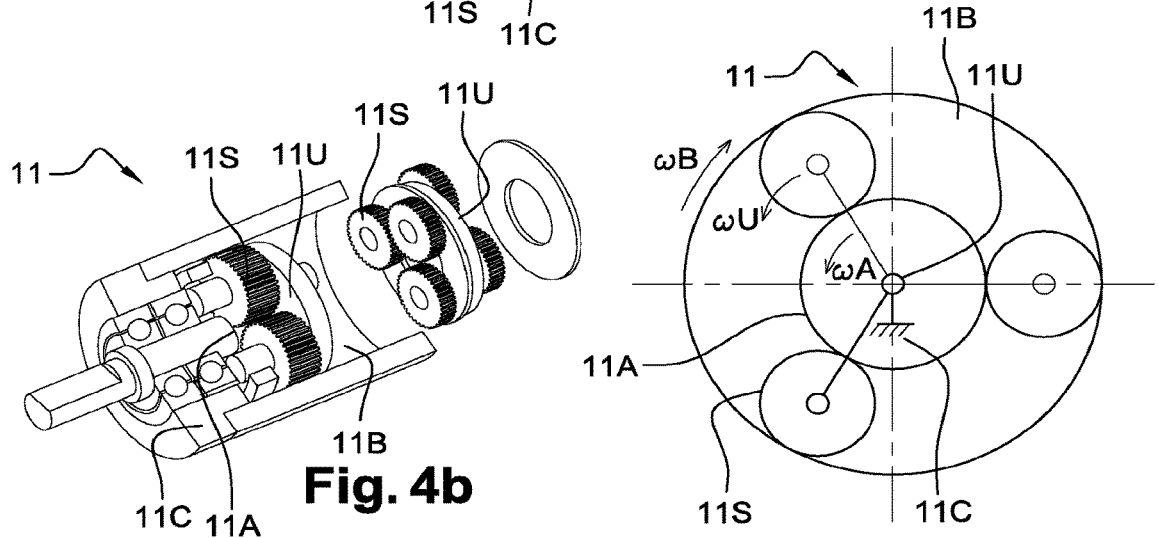
Fig. 4b
Fig. 4
Fig. 4c

CIRCUIT FOR SUPPLYING FUEL TO A TURBOMACHINE

FIELD OF THE DISCLOSURE

Embodiments of the present disclosure relate to the field of turbomachinery. The disclosure specifically concerns the fuel supply circuit and the regulation of fuel flow rate in that circuit.

BACKGROUND

Turbomachinery installed on an aircraft is equipped with a fuel supply circuit, delivering the fuel to the combustion chamber, which must be regulated as required according to flight conditions. Referring to FIG. 1, the fuel circuit usually includes a main high-pressure volumetric type pump 1 that sends the fuel to a hydromechanical group 2 before injection to the combustion chamber 3. The assembly is arranged to ensure, at the outlet to the combustion chamber, a fuel flow rate adapted to the need. A control box 4 usually controls the hydromechanical group 2 so that it adapts the flow rate sent by the pump 1 to the need of the combustion chamber 3.

Generally, the pump 1 is driven by an outlet shaft of the turbomachine accessory box 5, itself driven by an axle of the primary body of the turbomachine, not shown in FIG. 1. A drive device 6 is usually installed between the shaft of the accessory relay box 5 and the pump 1 to adapt the rotational speeds between these two devices. This device determines a ratio K between the speed of the pump 1 and the rotational speed $\omega$ of the turbomachine drive shaft. This device usually also drives a means 7 for supplying the circuit from the fuel tanks 8.

The linear characteristic Cyl of the pump 1 between the fuel flow rate and its driving speed depends in particular on its displacement. The pump 1 must be dimensioned in such a way that this displacement allows delivering the flow rates required for all the operating speeds of the turbomachine, i.e. the speed of the outlet shaft of the accessory relay box 5, both at low speed and at high speed.

As can be seen in FIG. 2, representing the flow rate variations F as a function of the rotational speed $\omega$ of the drive shaft of the turbomachine, the fuel requirement F1 varies non-linearly as a function of the turbomachine speed. The rotational speed $\omega$ of the drive shaft of the turbomachine varies between a minimum value $\omega$min, for the ignition of the turbomachine, and a maximum value $\omega$max for the take-off. The speed corresponding to a cruise flight lies between these two extremes.

According to the application, the crucial point is located either at low speed ignition or at take-off, at high speed. In FIG. 2, this crucial point is located at the ignition level, the displacement of the pump must be chosen in such a way that its linear characteristic is equal to the Cyl1 value, to ensure enough flow rate during all flight conditions. This Cyl1 value can be significantly higher than the minimum Cylmin value required under certain flight conditions, or even the Cyl2 value required during take-off.

According to this dimensioning, the flow rate provided by the pump therefore follows the line L1 on the flow rate/rotation speed diagram of FIG. 2. During a large phase of driving speed, especially in cruise flight, the pump therefore delivers a flow rate higher than the fuel flow rate requirement, and therefore a fuel surplus F2.

The hydromechanical group 2 must therefore return to the pump, through a recirculation loop 9, the fuel surplus F2 compared to the need.

This fuel flow rate regulation problem is further exacerbated when the fuel circuit is used, as shown in FIG. 1, to actuate variable geometry 10 of the turbomachine. The actuation of the variable geometry 10 creates variations in fuel requirement in the circuit that must be considered in the dimensioning of the pump 1, in the operation of the hydromechanical group 2 and in the characteristics of the recirculation loop 9.

This architecture of the fuel supply system has several disadvantages. The flow rate surplus injected by the pump 1 induces a surplus of power draw on the accessory relay box 5 compared to the need, which is detrimental to the efficiency of the turbomachine. The mechanical power surplus transforms into thermal power dissipated in the recirculation loop 9 which must be evacuated. This has a negative influence on the size and mass of the fuel circuit, especially for unrepresented heat exchangers placed to dissipate heat in this circuit.

It is therefore important to adapt the flow rate of the pump 1 to the different operating points of the turbomachine in order to gain in power withdrawn from the accessory relay box 5, which is not allowed by the state-of-the-art drive device 6.

In addition, a hydromechanical group 2 according to the state of the art, not detailed in FIG. 1, is usually composed of:
- a metering unit controlled by a servo valve whose position is controlled by a position sensor;
- a regulating valve, sending the flow rate surplus delivered by the pump into the recirculation loop 9, and regulating the pressure difference across the metering unit;
- a stop valve, controlled by a servo valve allowing to pressurize the fuel system and to cut off the injection.

The dimensioning of the pump 1 is normally carried out by considering a flow rate surplus equal to the sum of the system leaks, the minimum flow rate required to regulate the pressure difference across the metering unit and the flow rate related to the displacements of the variable geometry 10.

This flow rate surplus may represent between 60 and 95% of the total flow rate dimensioning the pump 1, considering the diagram in FIG. 2.

Assuming that the problem of adapting the rotational speed of the pump according to the operating points of the turbomachine has been solved, a conventional fuel circuit requires this last flow rate surplus. It therefore does not allow to reach the maximum power gain made possible by a possible adaptation of the speed of the pump 1.

The purpose of the disclosure is to propose a solution that makes it possible to take more optimal advantage of a power gain allowed by adapting the pump speed to the fuel need of the turbomachine for its various operating points and to draw power from the drive shaft corresponding to the strict need.

SUMMARY

The first object of the disclosure is a fuel supply system for a turbomachine, comprising a fuel circuit comprising:
- a pump arranged to send into the fuel circuit a fuel flow rate which is an increasing function of the rotational speed of a shaft of the pump;
- a hydromechanical group arranged to control a fuel outlet to a combustion chamber;
- a drive device arranged to drive the shaft of the pump with a controllable rotational speed;
- a branch comprising actuators for controlling variable geometry of the turbomachine, the branch starting with a branch connection on a derivation placed between the outlet of the pump and the hydromechanical group;

the system being configured to regulate a fuel flow rate to the combustion chamber from a flow rate set point value, characterized in that the supply system further comprises:
- a flow rate sensor placed in the hydromechanical group;
- a flow rate loop arranged to determine a pressure set point value at the outlet of the pump as a function of the flow rate set point value and a measurement provided by the flow rate sensor;
- a pressure sensor placed in the fuel circuit at the outlet of the pump;
- a pressure loop arranged to control the speed of the drive device from a difference between a pressure measurement provided by the pressure sensor and the pressure set point value, so as to quickly adapt the flow rate provided by the pump to the flow rate set point value.

Thanks to the rapid reaction obtained by the pressure loop, which reacts quickly, for example to the stresses of the actuators of variable geometry, it is possible here even for an architecture with variable geometry to eliminate the fuel recirculation loop. This concept therefore makes it possible to take optimal advantage of the ability of the drive device to adapt the speed of the pump to provide a flow rate corresponding to the need.

In particular, without the pressure loop, the flow rate demands from the actuators of variable geometry may generate an impact on the injected flow rate, which impact depends on the level of the demanded flow rate for the actuators and the reaction time of the flow rate loop.

This concept therefore makes it possible to reduce the power withdrawn to supply the turbomachine with fuel and to reduce thermal rejections.

The reactivity of the system, and notably of the pressure loop, is particularly adapted to the case where the fuel circuit is used to actuate the variable geometry.

Such a fuel supply system therefore makes it possible to eliminate completely the recirculation loop thanks to the reactivity of the system. It also uses a simpler and less cumbersome hydromechanical group than that of the conventional solution.

Preferably, hydraulic delay means are placed in the fuel circuit, between the derivation and the actuators of the variable geometry in order to minimize the electrical power required by the drive device.

These delay means are advantageously formed by a hydraulic accumulator coupled with a pressure regulator.

These delay means make it possible to reduce the technological constraints related to the reactivity on the drive device and on the means for controlling this device. These delay means allow to mainly reduce the electrical power required to control the drive device, i.e. the size of the machines for controlling this device.

The second object of the disclosure is a fuel supply system for a turbomachine, comprising a fuel circuit comprising:
- a pump arranged to send into the fuel circuit a fuel flow rate which is an increasing function of the rotational speed of a shaft of the pump;
- a hydromechanical group arranged to control a fuel outlet to a combustion chamber;
- a drive device arranged to drive the shaft of the pump with a controllable rotational speed;
- a branch comprising actuators for controlling variable geometry of the turbomachine, the branch starting with a branch connection on a derivation placed between the outlet of the pump and the hydromechanical group;

the system being configured to regulate a fuel flow rate to the combustion chamber from a flow rate set point value, characterized in that the supply system further comprises:
- a metering unit placed in the hydromechanical group arranged to send a flow rate equal to the flow rate set point value to the outlet of the fuel circuit;
- a regulating valve arranged to be hydraulically controlled by a pressure difference across the metering unit in order to maintain a constant pressure difference across the regulating valve equal to a constant reference pressure;
- means for measuring the pressure difference across the regulating valve;
- a flow rate loop arranged to control the current of a servo valve for controlling the metering unit from the flow rate set point value and a measured flow rate via the metering unit;
- a pressure loop arranged to control the speed of the drive device from a difference of the pressure difference across the regulating valve with respect to the constant reference pressure, so as to quickly adapt to the flow rate provided by the pump to the flow rate set point value, in particular when actuating the variable geometry.

The pressure loop is mainly active during the flow rate demands from the variable geometry.

Thanks to the rapid reaction obtained by the pressure loop, which reacts quickly, for example to the stresses of the actuators of variable geometry, the fuel recirculation loop can be greatly reduced. This concept therefore makes it possible to take optimal advantage of the ability of the drive device to adapt the speed of the pump to provide a flow rate corresponding almost to the need because a minimum recirculation loop remains which allows controlling the drive device during the flow rate demands from the variable geometry.

In particular, without the pressure loop, the flow rate demands from the actuators of the variable geometry may generate an impact on the injected flow rate because the recirculation loop is not dimensioned to compensate for these variable geometry flow rate demands, which impact depends on the level of the demanded flow rate for the actuators and the reaction time of the flow rate loop.

This concept therefore makes it possible to reduce the power withdrawn to supply the turbomachine with fuel and to reduce thermal rejections.

The reactivity of the system, and notably of the pressure loop, is particularly adapted to the case where the fuel circuit is used to actuate the variable geometry.

Such a fuel supply system uses an existing hydromechanical group and requires the use of a minimum recirculation loop. In comparison to the prior art, such a fuel supply system makes it possible to significantly reduce the power withdrawn from the turbomachine as well as thermal rejections.

The technical features mentioned below may be applied to any of the fuel supply systems described above.

Preferably, the drive device is intended to drive the pump from a drive shaft of the turbomachine and comprises an epicyclic gear reducer comprising three elements, a central sun gear, an external ring gear and a planet carrier whose planets mesh with the sun gear and the ring gear, a first of the three elements being intended to be connected to the drive shaft and a second of the three elements being coupled to the shaft of the pump, the device being characterized in that the three elements are rotatably movable about an axis of the reducer, in that the transmission device further comprises at least first electrical means arranged to drive in rotation the third of the elements of the reducer, so as to modify a rotational speed ratio between the drive shaft and the shaft of the pump.

Even more preferably, the drive device comprises second electrical means coupled to the first or second of the elements of the reducer, the first and second electrical means being arranged to transfer electrical power reversibly from each other.

The power transfer between the two electrical means allows to reduce the power withdrawn from the turbomachine shaft and to not provide any electrical power to the device.

Preferably, the system includes electronic means arranged to form a speed feedback loop of the control of the first electrical means, so as to ensure the power transfer between the two electrical means.

The dynamics of the system depends on the electrical power installed to accelerate the low inertia of the first and second electrical means and thus to readjust the speed of the pump.

Advantageously, the flow rate sensor is obtained by a flow rate metering unit whose position reflects the flow rate that passes through it.

The disclosure also concerns a turbomachine comprising a system as described previously.

Advantageously, an accessory relay box is placed between the drive shaft and the transmission device.

DESCRIPTION OF THE DRAWINGS

This disclosure shall be better understood, and other details, characteristics and advantages of this disclosure shall appear more clearly when reading the description of a following non-limiting example, with reference to the attached drawings on which:

FIG. 3 very schematically shows a half section of a turbomachine that can use the disclosure;

FIG. 4 shows exploded views and a diagram for an epicyclic gear reducer that can be used by the disclosure;

Figure 1:
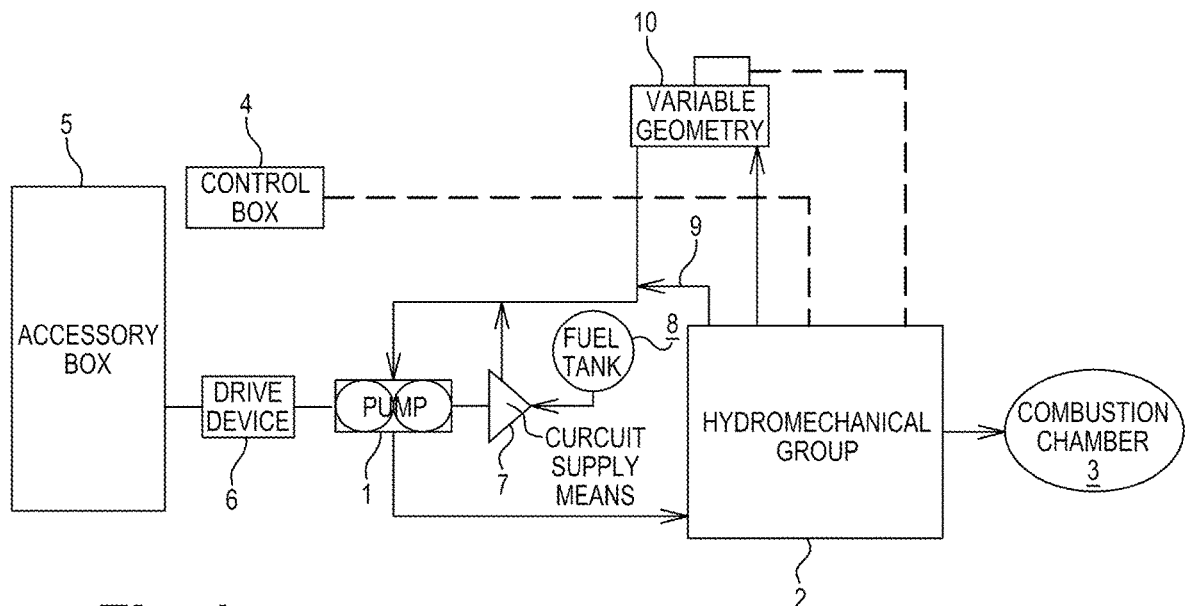
FIG. 1 very schematically shows a fuel circuit according to the state of the art.

The elements having the same functions in the different implementations have the same references in the figures.

DETAILED DESCRIPTION

In a turbomachine, for example a dual flow turbomachine shown in FIG. 3, the outlet air flow at fan 20 is divided into a primary flow P entering the engine and a secondary flow S surrounding the latter. The primary flow then passes through low-pressure compressors 21 and high-pressure compressors 22, the combustion chamber 3 supplied by the fuel circuit mentioned previously, and then high-pressure turbines 24 and low-pressure turbines 25. Generally, all the high-pressure compressors 22 and high-pressure turbines 24 rotate as a unit on a common axis 26 and form the engine part of the turbomachine with the combustion chamber.

Generally, the drive shaft 26 drives the accessory relay box 5 which can include several gear trains connected to outlet shafts to drive various equipment units. Here one of the outlet shafts of the gearbox drives, by a drive device 6', the volumetric pump 1 which supplies the hydromechanical group 2 injecting the fuel into the combustion chamber 3. Generally also, the accessory relay box makes the connection between the drive shaft 26 and a starter/generator, not shown in FIG. 3, which can be used to drive the turbomachine during the start-up phases or to generate an electric current when the turbomachine is on.

The turbomachine may also have variable geometry 10, mentioned previously, which can be activated under certain conditions of use. This variable geometry 10 is, for example, variable-pitch vanes at the inlet of a low-pressure compressor.

Figure 6:
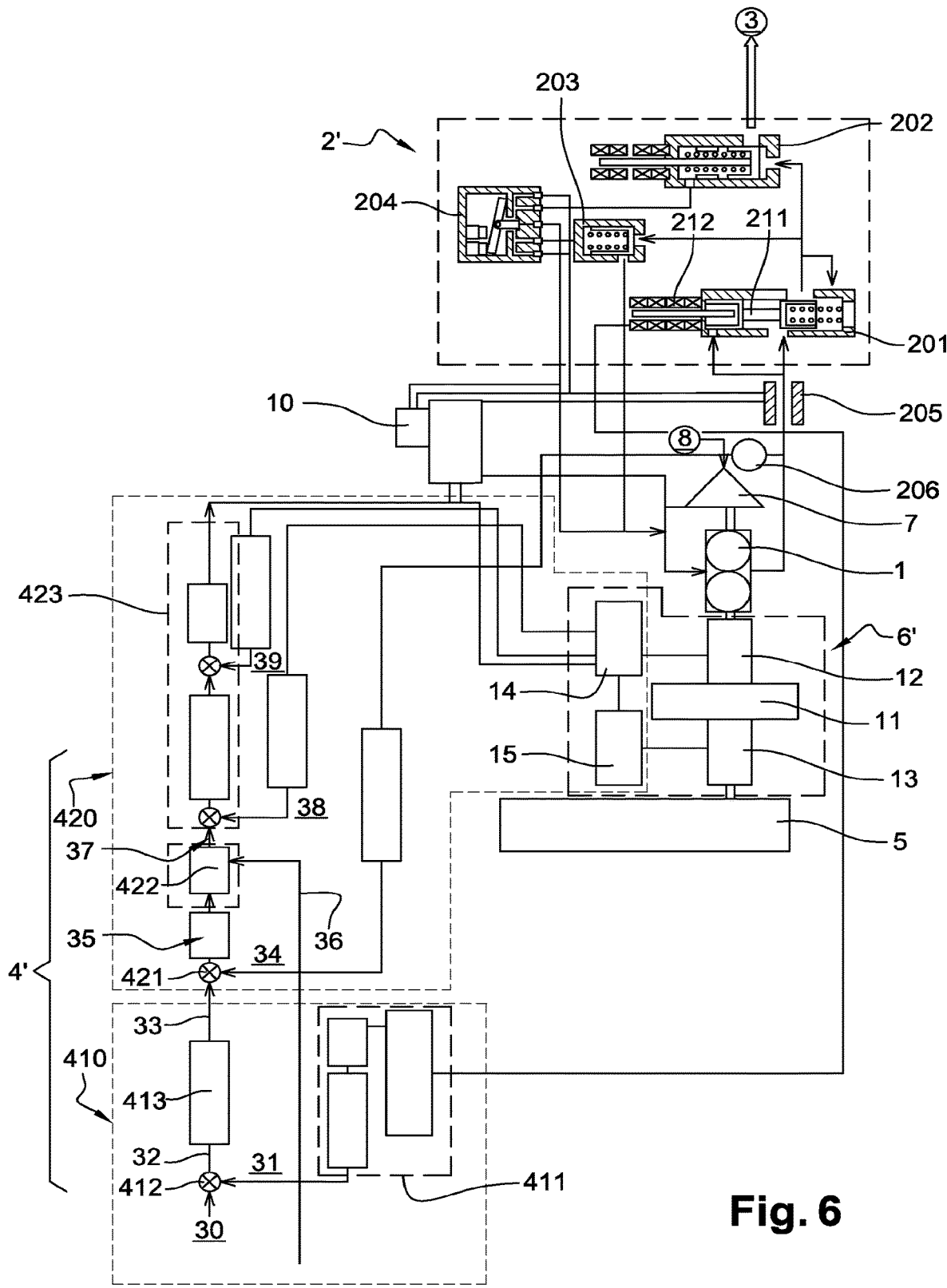
FIG. 6 very schematically shows a first embodiment of a fuel supply system according to the disclosure.
Figure 7:
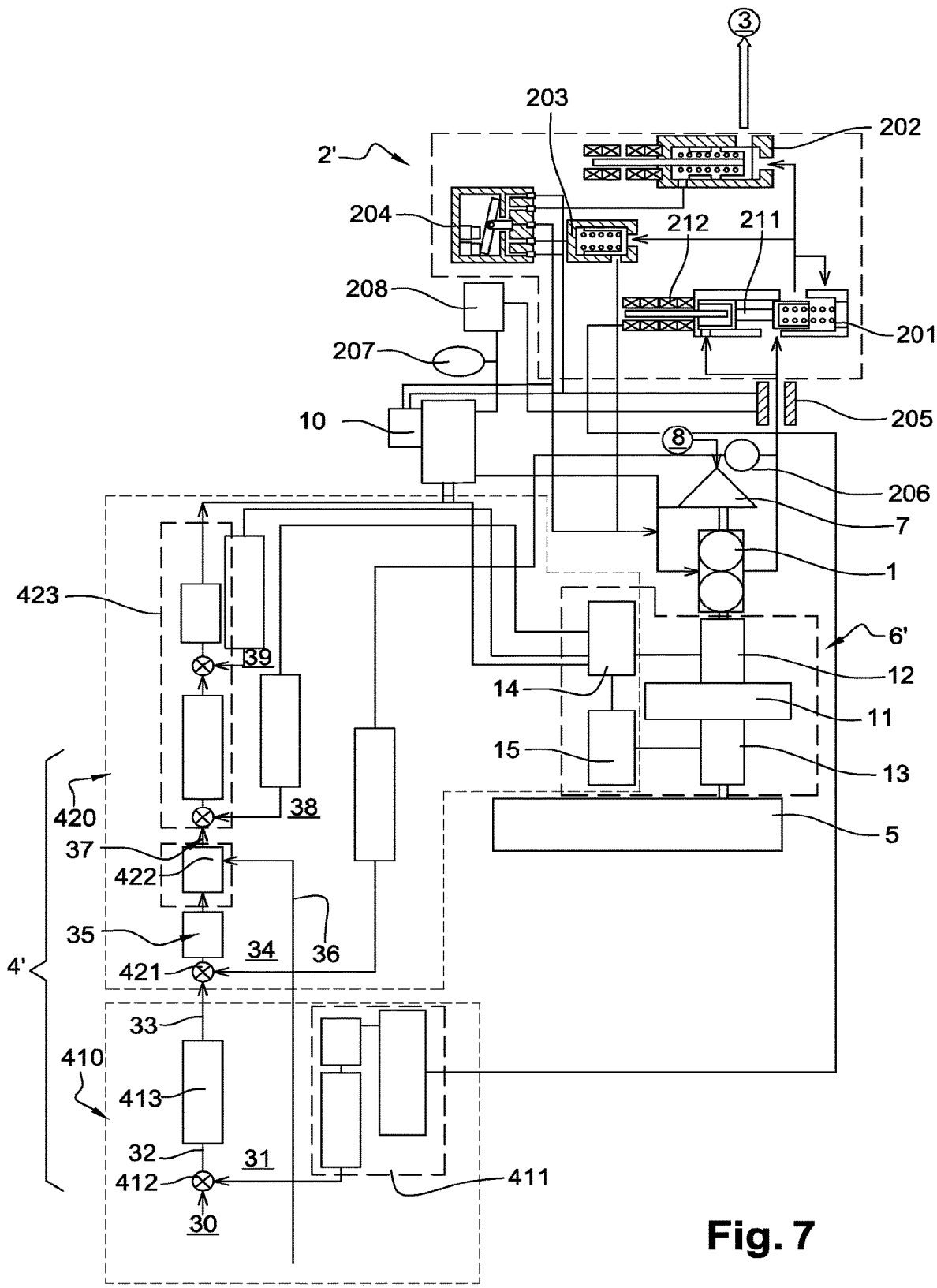
FIG. 7 very schematically shows a variant of the first embodiment of a fuel supply system according to the disclosure.
Figure 8:
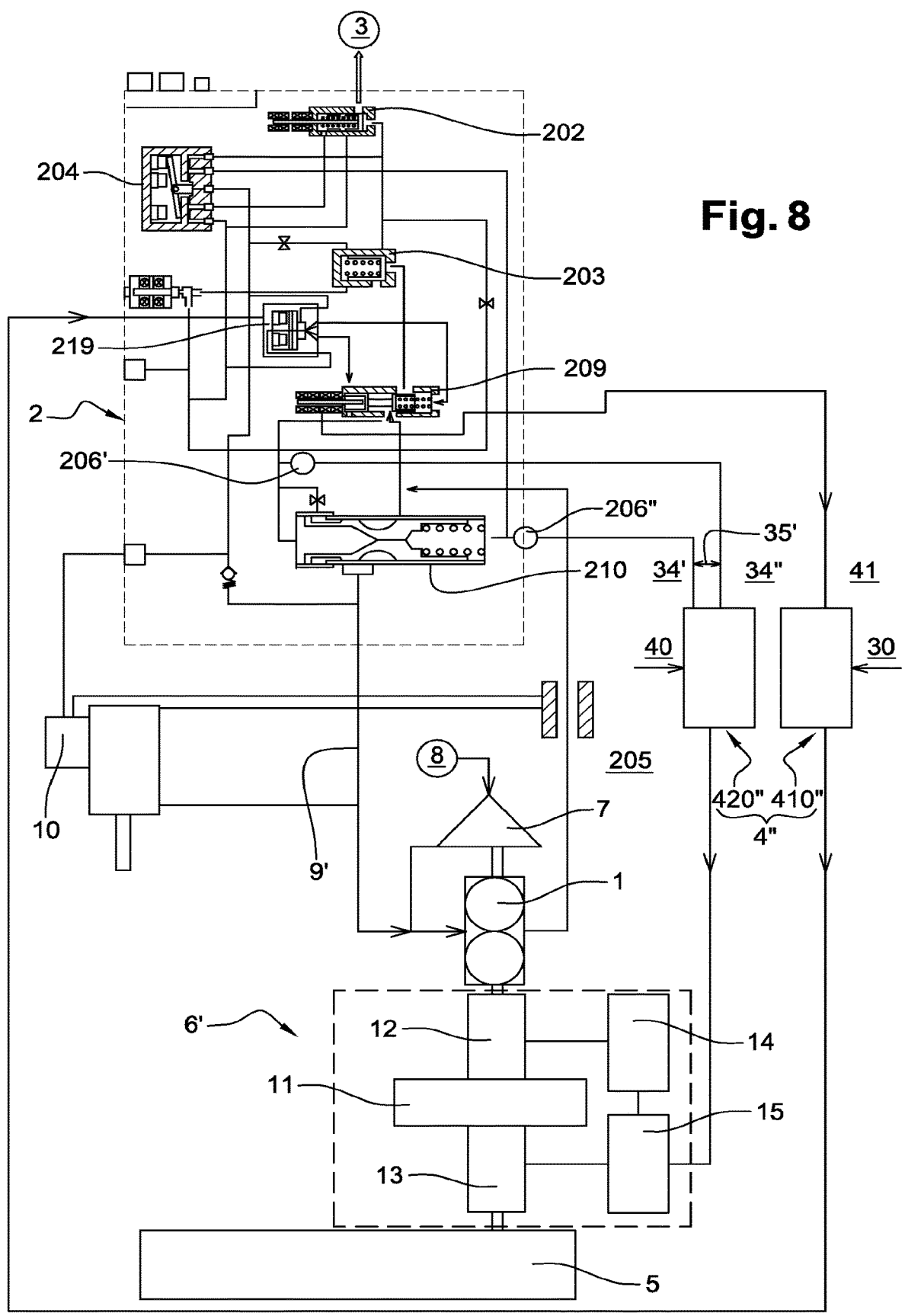
FIG. 8 very schematically shows a second embodiment of a fuel supply system according to the disclosure.

Here, with reference to FIG. 6, 7 or 8, the fuel supply system has a drive device 6' between the accessory relay box 5 and the pump 1 different from that of the system in FIG. 1. The pump 1 can be of the same nature as for the conventional solution. It is a rotary volumetric pump, whose flow rate is an increasing function of the rotational speed ω1, able to provide the flow rate necessary for the injection into the combustion chamber 3 and to pressurize the fuel circuit. Preferably, it has a linear characteristic Cyl relating the outlet flow rate to the rotational speed ω1.

First of all, we will show that there is at least one solution to make a drive device 6' capable of varying the ratio between the rotational speed of the shaft of the accessory relay box 5 and the rotational speed of the shaft of the pump 1, in order to be able to adapt the speed of the pump 1 to the different operating points of the turbomachine.

The drive device 6' shown has an epicyclic gear reducer whose properties are used to adapt the rotational speed of the pump 1 to the need for fuel flow rate according to the different operating speeds of the turbomachine.

With reference, to FIG. 4, the epicyclic gear reducer 11 comprises:

a central sun gear 11A, arranged to be able to rotate about the axis of the epicyclic gear at a speed ωA;

planets 11S meshing with the central sun gear 11A and carried by a planet carrier 11U, the planet carrier 11U being arranged to be able to rotate about the axis of the epicyclic gear at a speed ωU;

an external ring gear 11B with which the planets 11S also mesh, the ring gear 11B being arranged to be able to rotate about the axis of the epicyclic gear at a speed ωB.

A characteristic of the epicyclic gear reducer 11 is therefore that its three elements, the central sun gear 11A, the planet carrier 11U and the ring gear 11B, are able to rotate. Here, for example, the ring gear 11B is free to rotate inside a fixed casing 11C protecting the reducer 11.

The operation of the epicyclic gear of the reducer 11 is governed by Willis equation, which shows that it is a two degrees of freedom mechanism and that the knowledge of the rotational speeds of two elements among the central sun gear 11A, the planet carrier 11U and the ring gear 11B, allows the calculation of the rotational speed of the third one.

Rotation of the central sun gear 11A: ωA
Rotation of the planet carrier 11U: ωU
Rotation of the ring gear 11B: ωB $$(\omega A - \omega U)/(\omega B - \omega U) = k \text{ or } \omega A - k^*\omega B + (k-1)^*\omega U = 0 \quad \text{WILLIS equation:}$$

In Willis equation, the factor k, also called the epicyclic gear reason, is a constant determined by the geometry of the gears. For the reducer 11 in FIG. 4, k=−ZB/ZA, where ZA is the number of teeth of the central sun gear A and ZB the number of teeth of the ring gear B. The factor k is therefore negative with a modulus lower than 1.

It is therefore understood that, if the outlet shaft of the accessory relay box 5 is coupled to one of the three elements and the shaft of the pump 1 is coupled to a second element, the rotational speed of the pump 1 can be varied for a given speed of the shaft of the box 5 by varying the rotational speed of the third element.

A first electric motor 12 is coupled to the third element to control the rotational speed of the latter.

Six combinations are possible to position the three equipment units, accessory relay box 5, pump 1 and electric motor 12, with respect to the three elements of the epicyclic gear reducer 11.

A second motor 13 is also coupled to one of the elements of the reducer 11 which is not connected to the first motor 12. The position of the second motor 13 doubles the number of possible combinations for the drive device 6'. This results in twelve combinations listed in the table below.

This table also indicates the function giving the speed ω1 of the pump 1 from the speed ω5 of the shaft of the box 5 and the speed ω12 of the first motor 12. The rotational speed ω13 of the second motor 13 is determined by the rotational speed of the equipment unit with which it is coupled in series on the reducer 11, either the shaft of the pump 1 or the outlet shaft of the box 5. In this table, option 1 corresponds to the cases where the second motor 13 is coupled in series with the pump 1 on the same element of the reducer 11, and option 2 corresponds to the cases where the second motor 13 is coupled in series with the outlet shaft of the accessory relay box 5 on the same element of the reducer 11.

ring gear 11B, the pump 1 is connected to the planet carrier 11U, the first electric motor 12 is connected to the central sun gear 11A, and the second motor 13 is connected to the planet carrier 11U.

The first motor 12 and the second motor 13 each comprises a stator and a rotor. The motors 12, 13 are controllable in terms of torque applied to their rotor and rotational speed ω12, ω13 of their rotor. These are for example AC asynchronous motors. The torque and speed of each motor 12, 13 are then controlled by the electrical power and the frequency of the current sent by a converter 14, 15 dedicated to each.

In addition, the second motor 13 is electrically connected to the first motor 12 through the reversible voltage converters 14, 15, in order to pass power from one to the other.

In addition, with reference to FIG. 6, 7 or 8, the fuel supply system also differs from that in FIG. 1 in that a control electronics 4' or 4" is connected to the converter 14, to control the speed ω12 and the torque of the first motor 12 in order to adapt the speed col of the pump 1. Generally, the converter 15 is slaved to the converter 14 to control the torque of the second motor 13 in order to manage the power transfer between the two motors.

The study of the reducer 11 shows that the torque CA acting on the sun gear 11A, the torque CB acting on the ring gear 11B and the torque CU acting on the planet carrier 11U are related by two relationships:

$$CA + CB + CU = 0 \text{(epicyclic gear equilibrium)}$$

$$\omega A^*CA + \omega B^*CB + \omega U^*CU = 0 \text{(dynamic equilibrium)}$$

Considering the relationships relating the rotational speeds of these elements, it is possible to calculate the torques acting on two elements of the reducer 11 knowing the third one.

The second motor 13, being connected in series with the pump 1 or the box 5, has its rotational speed determined as being equal to that of this equipment unit.

It is however understood that it provides an additional degree of freedom to the system according to the torque it exerts and which is added to that of the pump 1 or the box on the corresponding element of the reducer 11.

TABLE 1

| Connection box/pump/first motor | | | Connection second motor | |
|---|---|---|---|---|
| Box 5 connected to the planet carrier 11U | | | | |
| Motor 12 | Pump 1 | Pump speed | Option 1 | Option 2 |
| 1A  ring gear 11B | sun gear 11A | ω1 = (1 − k)*ω5 + k*ω12 | sun gear A | planet carrier 11U |
| 1B  sun gear 11A | ring gear 11B | ω1 = −ω5*(1 − k)/k + ω12/k | ring gear B | planet carrier 11U |
| Box 5 connected to the ring gear 11B | | | Option 1 | Option 2 |
| Motor 12 | Pump 1 | | | |
| 2A  planet carrier 11U | sun gear 11A | ω1 = k*ω5 + (1 − k)*ω12 | sun gear A | ring gear B |
| 2B  sun gear 11A | planet carrier 11U | ω1 = −ω5*k/(1 − k) + ω12/(1 − k) | planet carrier 11U | ring gear B |
| Box 5 connected to the sun gear 11A | | | Option 1 | Option 2 |
| Motor 12 | Pump 1 | | | |
| 3A  ring gear 11B | planet carrier 11U | ω1 = ω5/(1 − k) − ω12*k/(1 − k) | planet carrier 11U | sun gear A |
| 3B  planet carrier 11U | ring gear 11B | ω1 = ω5/k − ω12*(1 − k)/k | ring gear B | sun gear A |

Figure 5:
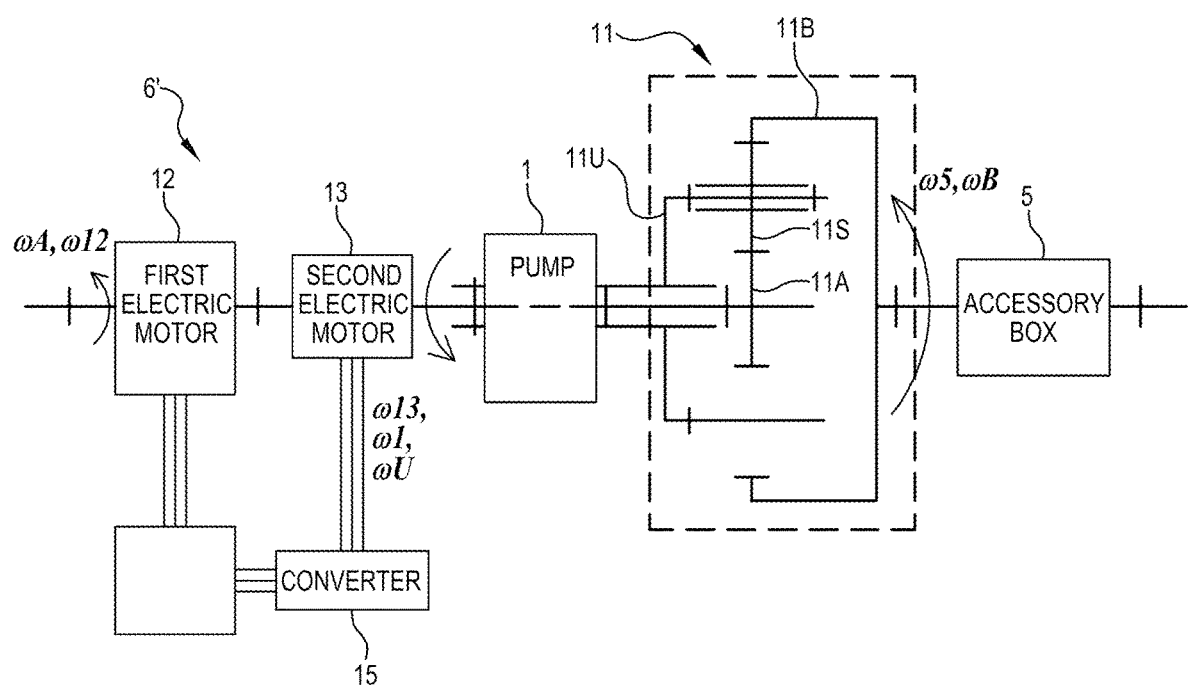
FIG. 5 shows the diagram of a transmission system between the turbomachine and the pump, using a reducer from FIG. 4.

In the example shown in FIG. 5, corresponding to the configuration "2B-Option1", the box 5 is connected to the This additional degree of freedom can be used to ensure power transfer with the first motor: either providing power when the first motor 12 intervenes to accelerate the pump 1 with respect to the drive of the box 5, or absorbing power when the first motor 12 intervenes to brake the pump 1.

Figure 2:
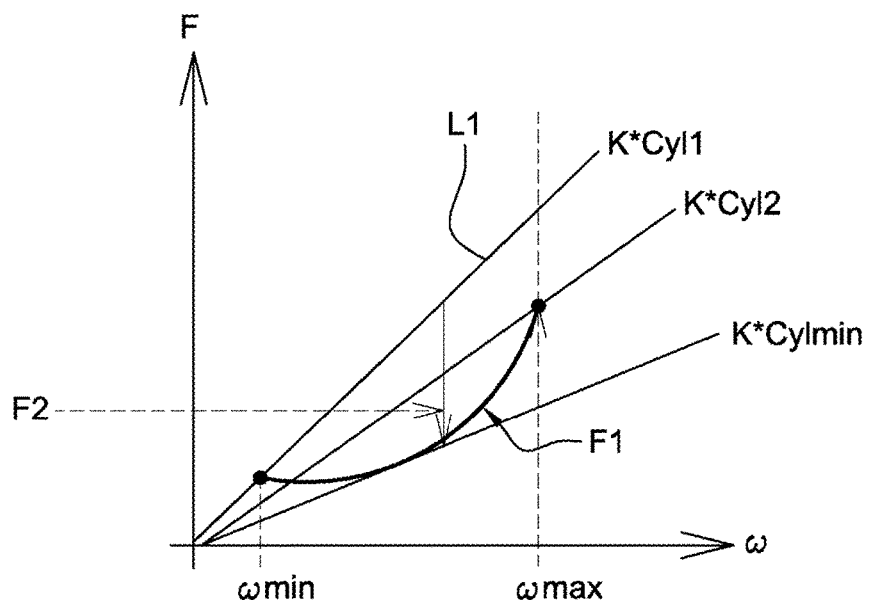
FIG. 2 shows a rotational speed and flow rate diagram showing the difference between the flow rate provided by the fuel pump and the requirement for a circuit as shown in FIG. 1.

It is possible to use other configurations than that illustrated in FIG. 5. The choice depends on the operating characteristics of the turbomachine. The choice of the parameters of the device which are the factor k of the epicyclic gear reducer 11, the ratio of the rotational speed ω5 at the outlet of the box 5 with respect to the rotational speed of the axle of the turbine, the linear characteristic Cyl of the pump 1, and the choice among the configurations 1A to 3B, must be done to achieve in particular the following objectives:
- allowing the pump 1 to rotate at a speed tot that adjusts to provide a flow rate Cyl*ω1 that corresponds to the need F1, as shown for example in FIG. 2, when the rotational speed of the axle of the turbine varies between its minimum value ωmin and maximum value ωmax;
- minimizing the power spent in the motor 12 to adjust the speed col of the pump 1 over the operating range of the turbomachine.

In addition, the technological constraints on the equipment units used generally imply that the speed col of the pump 1 must be higher than that ω5 of the outlet shaft of the accessory relay box 5.

This concept with two auxiliary electric motors for the drive system between the accessory relay box 5 and the pump 1 is very innovative because it offers the following advantages:
- withdrawal from the accessory relay box 5 only of the mechanical power corresponding to the power requirement for the supply of the variable geometry (pressure requirement) and for the fuel flow rate supply (fuel flow rate requirement),
- reduction of the displacement of the pump 1,
- drastic reduction in the dimensioning of the recirculation loop of the pump flow rate,
- simplification of the architecture of the hydromechanical group 2 for fuel regulation,
- no need for external power during the controlling of the pump speed by a motor 12 thanks to the power transfer between this motor and the second motor 13.

In the system described above, the first motor 12 and the second motor 13 are specially dedicated equipment units, added to operate the drive device 6'. In a variant, the starter of the turbomachine can be used as the first or second motor of the device.

In addition, according to the disclosure, the converters 14, 15 and the motors 12, 13 of the drive device 6' are advantageously designed with a dimensioning and an electrical power sufficient to react with a very short time, in the order of one hundredth of a second.

The fuel supply system concept developed in the following allows optimal use of such a drive device 6'.

We will now describe several embodiments of the entire fuel supply system arranged to exploit at best the ability of the drive device 6' to adapt the speed of the pump 1.

With reference to FIG. 6, a first embodiment of the fuel supply system according to the disclosure, includes:
- a drive device 6' between the accessory relay box 5 and the pump 1 as described above, allowing to adapt the speed of the pump 1;
- a pump 1 dimensioned to be adapted to the flow rate supplied with the system according to the disclosure;
- a means 7 for supplying the circuit from the fuel tanks 8;
- an adapted hydromechanical group 2';
- a control electronics 4'.

Here, the fuel supply system is also connected to actuators of variable geometry 10.

The hydromechanical group 2' for this embodiment includes the following elements:
- a fuel flow rate sensor 201 between the pump 1 and the injection to the combustion chamber 3;
- a pressurization valve 202 at the injection to the combustion chamber 3;
- a return valve 203 branched between the flow rate sensor 201 and the pressurization valve 202;
- a servo valve 204 essentially controlling the pressurization valve 202 and the return valve 203.

In a preferred embodiment, the flow rate sensor 201 is realized by a modified metering unit. A metering unit usually used in a conventional circuit includes a slide valve 211 whose position controls the flow rate passing through the metering unit. In addition, a sensor 212 of the slide valve position allows to slave the metering unit, classically by a servo valve. Here, the position of the slide valve is not controlled by a servo valve but directly by the pressure difference across the metering unit, as is the case with the control of the regulating valve of the conventional solution. Knowing the characteristic of this metering unit, the position read by the sensor of the slide valve 211 position provides information about the flow rate really injected by the pump 1.

The hydromechanical block 2' therefore loses its function of regulating the flow rate but ensures a function of flow rate sensor. It keeps the functions of cutting off the fuel and of pressurization of the system.

The pressurization valve 202 allows ensuring the minimum pressure for the correct operation of the variable geometry, as well as the cut-off of the injected flow rate.

The return valve 203, allows ensuring the exhaust of the flow rate delivered by the pump 1 in order to not increase pressure in the circuit, when this cut-off is activated by the servo valve 204.

The fuel circuit according to the disclosure includes additionally:
- a derivation 205 to supply a loop for controlling the actuators of the variable geometry 10; this derivation 205 is placed here between the pump 1 and the flow rate sensor 201 of the hydromechanical group 2';
- a pressure sensor 206, placed at the outlet of the pump 1 and before the derivation 205.

The pressure sensor 206 is able to provide fast measurements, typically with a sampling rate of about 100 Hz, to react to rapid pressure variations coming notably from the actuation of the variable geometry.

The control electronics 4' has a first flow rate loop 410 (hereinafter referred to as flow rate loop 410), which uses a flow rate set point value 30 from the turbomachine computer, not shown, and the flow rate measured thanks to the flow rate sensor 201. A modulus 411 of the flow rate loop 410 uses the information from the flow rate sensor 201 to calculate a measured flow rate 31 after the derivation 205. A comparator 412 calculates a difference 32 between the measured flow rate and the flow rate set point value 30. From the flow rate difference 32, a modulus 413 calculates a pressure set point value 33 to obtain at the outlet of the pump 1, knowing the characteristics of the pump 1 and the hydraulic circuit. This flow rate loop 410 of the control electronics can be integrated into the on-board computer (FADEC) of the turbomachine, not shown. This flow rate loop 410 is advantageously not fast.

Here, the control electronics 4' comprises a second pressure loop 420 (hereinafter referred to as pressure loop 420)

which uses the pressure set point value 33 from the flow rate loop 410 and the pressure measurement 34 provided by the pressure sensor 206 and which controls the drive device 6' so as to obtain the correct pump 1 speed. The reaction time of the flow rate loop 410 may be too long to react to the impacts of the flow rate demands on the injection line, which is why the control electronics has, in this example, a second, faster local pressure regulation loop 420.

The pressure loop 420 starts with a comparator 421 which establishes a difference 35 between the pressure set point value 33 developed by the flow rate loop 410 and the pressure measurement 34 provided by the sensor 206, advantageously with a sampling rate of about 100 Hz.

Here, with a drive device 6' with power transfer between two motors, this pressure loop 420 controls the first motor 12 in speed and torque to correct the speed of the pump 1.

A first modulus 422 develops a speed set point value 37 of the first motor 12 from the pressure difference 35 and the speed set point value 36 of the pump. The speed set point value 36 of the pump corresponding to the flow rate set point value 30 can be provided by the turbomachine computer, knowing the characteristics of the pump 1 and the hydraulic circuit. The pressure difference 35 indicates whether this speed must be quickly corrected according to disturbances such as the actuation of the variable geometry 10. A difference 35 that decreases in algebraic value, for a pressure 34 that decreases, indicates that the flow rate is insufficient, therefore the rotational speed of the pump must be increased, and conversely, if the pressure 34 increases compared to the pressure set point value 33.

Then, a second modulus 423 successively establishes corrections for speed and torque of the first motor 12 using the speed set point value, with a feedback on a speed measurement 38 and a torque measurement 39 on this first motor 12.

The control electronics of the pressure loop 420 must be fast to react immediately to the pressure variations detected by the sensor 206, typically at a rate of 100 Hz. Preferably, for example, the sampling of speed 38 and torque 39 measurements are in the order of 200 Hz and 1000 Hz respectively. Preferably, the pressure loop 420 is therefore implemented by a dedicated electronic box, with fast electronics.

This pressure loop 420 controlling the drive device 6' from the pressure information allows a high reactivity of the drive device 6' to adapt the speed of the pump 1, in particular when actuating the variable geometry 10.

During a flow rate demand related to the control of the variable geometry 10, the pressure 34 measured by the pressure sensor 206 no longer depends only on the injection circuit, but also on the loads of the variable geometry 10.

The pressure then changes abruptly in the fuel circuit, at derivation 205. This pressure 34 drop, measured by the sensor 206, is compensated by the increase of the speed of the pump 1, controlled by the pressure loop 420 of the control electronics 4'.

The control set point value of the motor 12 is quickly corrected according to the difference 35 of the pressure set point value 33 and the pressure measurement 34 at the pump 1 outlet. This control set point value on the control motor 12 allows increasing the speed of the pump and the fuel flow rate.

To make this correction, the dimensioning of the motors 12 and 13 power preferably depends on the desired dynamics.

When the turbomachine is switched on, the pump 1 is driven at a minimum rotational speed. A part of the flow rate passes through the sensor 201 and is recirculated by the return valve 203.

The speed of the pump 1 is then adapted to reach the correct ignition flow rate set point value. The servo valve 204 is then activated, which results in the opening of the pressurization valve 202, the closing of the return valve 203 and thus allows the injection of the ignition flow rate to the combustion chamber 3.

This architecture is very advantageous because it makes it possible to no longer have a recirculation loop, to reduce the size of the hydromechanical group 2' and to respond quickly to flow rate demands thanks to the control of the drive device 6' by the pressure loop 420 on the pressure difference 35.

There is therefore no longer any need to dimension a recirculation loop to dissipate a large flow rate surplus and this makes it possible to gain in power withdrawn from the accessory relay box 5 for fuel supply. This also makes it possible to eliminate the regulating valve that exists in a conventional circuit.

In a preliminary study carried out on the basis of a particular type of application, where each operating point is described in terms of speed of the box 5, injected flow rate, cooling flow rate of the variable geometry 10, internal leaks, flow rate required to move the variable geometry and injection pressure, the inventors thus found a significant gain in power required to carry out the injection, whether with or without hydraulic supply for the variable geometry.

This concept also has other positive impacts.

Regarding the volumetric pump 1, its displacement can be reduced by at least one third compared to a conventional solution. There is also a gain in the overall dimensions due to the reduction in the diameter of the pinions and a mass gain.

Regarding the hydromechanical block 2', there is a simplification and mass gains in relation to the disappearance of a servo valve, the replacement of a regulating valve by a return valve and the possibility to eliminate an electro-valve.

The concept also allows to reduce the size of the heat exchangers.

It should be noted that this concept also works without variable geometry supply, for example if the latter is controlled by electrical means. In a configuration without variable geometry, the solution will only be easier to implement, and more efficient in terms of power gain.

In a variant of this first embodiment, with reference to FIG. 7, the supply system keeps the elements already described but a hydraulic accumulator 207 is installed on the hydraulic loop for controlling the variable geometry 10, between their actuators and the derivation 205.

Preferably, in order to not to initiate metering delays in the fuel circuit, due to the inflation or deflation of this accumulator 207, the latter operates at constant pressure. To this end, a pressure regulator 208 is installed so that a constant pressure difference is always present across the variable geometry 10.

The installation of the hydraulic accumulator 207 forms hydraulic delay means which here make it possible to limit the demand power at the electric motors, 12, 13 in the drive device. Generally, it limits the dimensioning constraints of the drive device 6' related to the reactivity.

As in the previous architecture, during a flow rate demand related to the control of the variable geometry 10, the control set point value of the motor 12 of the drive device 6' will then be quickly corrected according to the pressure difference 35 inferred from the pressure set point value 33 and the pressure measurement 34 by the sensor 206 at the outlet of the pump 1.

This solution remains without any recirculation loop, allowing to optimize the thermal rejections of the fuel circuit.

In a second embodiment of the disclosure, with reference to FIG. 8, a hydromechanical group 2, similar to that of the conventional solution, and a recirculation loop 9' are maintained.

In this case, the fuel supply system according to the disclosure still includes:
- a drive device 6' between the accessory relay box 5 and the pump 1 as described above, allowing to adapt the speed of the pump 1;
- a pump 1 dimensioned to be adapted to the flow rate supplied with the system according to the disclosure;
- a means 7 for supplying the circuit from the fuel tanks 8.

The fuel supply system is also connected to actuators of variable geometry 10. The fuel circuit according to the disclosure includes a derivation 205 to supply a loop for controlling the actuators of the variable geometry 10, this derivation 205 is placed here between the pump 1 and the hydromechanical group 2.

The hydromechanical group 2 for this embodiment includes the following elements:
- a pressurization valve 202 at the injection to the combustion chamber 3;
- a return valve 203 branched between a metering unit 209 and the pressurization valve 202, and branched toward the recirculation loop 9';
- a servo valve 204 controlling essentially the pressurization valve 202 and the return valve 203;
- a fuel metering unit 209 between the pump 1 and the injection to the combustion chamber 3, and its control servo valve 219 (or drive servo valve 219) to comply with a flow rate set point value 30;
- a regulating valve 210 operating to recirculate the fuel flow rate and arranged to be hydraulically controlled by the pressure difference across the metering unit 209 to maintain a constant pressure difference 35' across the regulating valve 210 and equal to a constant reference pressure 40.

In addition, the fuel supply system includes means 206', 206" for measuring the pressure difference 35' across the regulating valve 210.

More precisely, the fuel supply system includes two sensors 206' and 206" installed in the fuel circuit across the regulating valve 210, the pressures 34' and 34" indicated by these sensors 206' and 206" allow to measure the pressure difference 35'.

The fuel supply system further includes a control electronics 4", which is here different from that of the first embodiment. Indeed, the operation of the system is different.

As shown in FIG. 8, more specifically, the control electronics 4" includes a first flow rate loop 410" (hereinafter referred to as flow rate loop 410") and a second pressure loop 420" (hereinafter referred to as pressure loop 420") mounted in parallel with each other, i.e. the flow rate and pressure loops 410", 420" are independent of each other.

The flow rate loop 410" uses a flow rate set point value 30 from the turbomachine computer (FADEC) and a flow rate 41 measured thanks to the metering unit 209 to control the control servo valve 219 (and more precisely the current from the control servo valve 219). The flow rate loop 410" allows to regulate the fuel flow rate injected into the combustion chamber 3.

The pressure loop 420" uses the pressure difference 35' across the regulating valve 210 and the constant reference pressure 40 to control the drive device 6', and thus to adapt the flow rate supplied by the pump 1.

Advantageously, the sensors 206', 206" operate with fast sampling to allow the pressure loop 420" to react quickly on the drive device 6'.

In the pressure loop 420", the pressure difference 35' across the regulating valve 210 is compared to the constant reference pressure 40. The difference between the pressure difference 35' and the reference pressure 40 allows to generate a control at the drive device 6'.

In other words, it is the pressure difference 35' between the pressures 34', 34" measured by the sensors 206', 206" that indicates that a rapid adaptation of the flow rate is to be made, if this pressure difference 35' deviates from the constant reference pressure 40. The pressure loop 420" is therefore adapted to quickly correct the speed of the pump 1 via the drive device 6'.

During a demand from the variable geometry 10, the regulating valve 210 closes to compensate for the decrease in flow rate at the inlet of the hydromechanical group 2. The fact that the flow rate flowing in the recirculation loop 9' is low results in a difference of the pressure difference 35' with respect to the constant reference pressure 40 despite the slaving of the regulating valve 210 by the metering unit 209, which allows the drive device 6' to be controlled.

In other words, if the existing minimum recirculation loop 9' cannot compensate for the flow rate demands from the variable geometry 10, the total closing of the regulating valve 210 will not be able to guarantee a pressure difference 35' across it equal to the constant reference pressure 40 and a control will be generated to the drive device 6'.

Compared to the prior art, the flow rate in the recirculation loop 9' is minimized, thus during an actuation of the variable geometry 10, there is always a difference between the pressure difference 35' across the regulating valve 210 and the constant reference pressure 40, this difference being used to generate a control at the drive device 6'.

The measurement of the pressure difference 35' across the regulating valve 210 compared to the constant reference pressure 40 allows the pressure loop 420" to correct the speed set point value of the motor 12 of the drive device 6' of the pump 1 accordingly.

The regulating valve 210 is dimensioned only to provide a small percentage of the flow rate required to operate the variable geometry 10 so as to induce a pressure difference between the pressure difference 35' and the constant reference pressure 40.

This solution allows to adapt the speed control solution to onto an installation with an existing flow rate loop.

The fuel supply system shown in FIG. 8 requires the use of a minimum recirculation loop 9'. However, compared to the prior art, such a supply system allows to significantly reduce the power withdrawn from the turbomachine as well as thermal rejections.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A fuel supply system for a turbomachine, comprising a fuel circuit comprising:
   a pump positioned to send fuel into said fuel circuit at a fuel flow rate which is an increasing function of a rotational speed of a shaft of said pump, said fuel flow rate being provided to a combustion chamber;
   a hydromechanical group positioned to control a fuel outlet to the combustion chamber;
   a drive device positioned to drive the shaft of the pump with a controllable rotational speed;
   a branch comprising actuators for controlling a variable geometry of the turbomachine, said branch starting with a branch connection on a derivation positioned between an outlet of the pump and said hydromechanical group;
   the fuel supply system regulating the fuel flow rate to said combustion chamber from a flow rate set point value, wherein said the fuel supply system further comprises:
   a flow rate sensor positioned in the hydromechanical group;
   a flow rate loop positioned to determine a pressure set point value at the outlet of the pump as a function of the flow rate set point value and a measurement provided by said flow rate sensor;
   a pressure sensor positioned in the fuel circuit at the outlet of the pump; and
   a pressure loop arranged to control the controllable rotational speed of the drive device from a difference between a pressure measurement provided by the pressure sensor and said pressure set point value determined by the flow rate loop, to quickly adapt the fuel flow rate provided by the pump to the flow rate set point value,
   wherein the pressure loop is distinct from the flow rate loop, and wherein the pump is a volumetric pump.

2. The fuel supply system according to claim 1, wherein a hydraulic delayer is placed in the fuel circuit, between the derivation and the actuators of the variable geometry in order to minimize electrical power required by the drive device.

3. A turbomachine comprising a system according to claim 1.

4. The turbomachine according to claim 3, wherein an accessory relay box is positioned between the shaft and the drive device.

5. The fuel supply system according to claim 1, wherein the drive device drives the pump from a drive shaft of said turbomachine and comprises an epicyclic gear reducer comprising three elements, a central sun gear, an external ring gear, and a planet carrier whose planets mesh with the central sun gear and the external ring gear, a first of the three elements connected to the drive shaft and a second of the three elements coupled to the shaft of the pump, wherein said three elements are rotatably movable about an axis of the epicyclic gear reducer and said drive device further comprises at least a first electrical motor arranged to drive in rotation a third of said three elements of the epicyclic gear reducer to modify a rotational speed ratio between the drive shaft and the shaft of the pump.

6. The fuel supply system according to claim 5, wherein the drive device comprises a second electrical motor coupled to one of the first or second of said three elements of the epicyclic gear reducer, the first electrical motor and the second electrical motor arranged to transfer electrical power reversibly from each other.

7. The fuel supply system according to claim 1, wherein the flow rate loop is carried out by a first control unit and the pressure loop is carried out by a second control unit.

8. The fuel supply system according to claim 1, wherein the pressure loop is carried out faster than the flow rate loop.

9. A fuel supply system for a turbomachine, comprising a fuel circuit comprising:
   a pump positioned to send fuel into said fuel circuit at a fuel flow rate which is an increasing function of a rotational speed of a shaft of said pump, said fuel flow rate being provided to a combustion chamber;
   a hydromechanical group positioned to control a fuel outlet to a combustion chamber;
   a drive device positioned to drive the shaft of the pump with a controllable rotational speed;
   a branch comprising actuators for controlling a variable geometry of the turbomachine, said branch starting with a branch connection on a derivation positioned between an outlet of the pump and said hydromechanical group;
   the fuel supply system regulating the fuel flow rate to said combustion chamber from a flow rate set point value, wherein said fuel supply system further comprises:
   a metering unit positioned in the hydromechanical group arranged to send a flow rate equal to the flow rate set point value to the outlet of the fuel circuit;
   a regulating valve positioned to be hydraulically controlled by a pressure difference across the metering unit to maintain a constant pressure difference across the regulating valve equal to a constant reference pressure;
   sensors for measuring a pressure difference across the regulating valve;
   a flow rate loop positioned to control a current of a servo valve for controlling the metering unit from the flow rate set point value and a measured flow rate via the metering unit; and
   a pressure loop positioned to control the controllable rotational speed of the drive device based on a difference of said pressure difference across the regulating valve relative to the constant reference pressure, to quickly adapt the fuel flow rate provided by the pump to the flow rate set point value when actuating said variable geometry,
   wherein the pressure loop is distinct from the flow rate loop, and wherein the pump is a volumetric pump.

10. The fuel supply system according to claim 9, wherein the drive device drives the pump from a drive shaft of said turbomachine and comprises an epicyclic gear reducer comprising three elements, a central sun gear, an external ring gear, and a planet carrier whose planets mesh with the central sun gear and the external ring gear, a first of the three elements connected to the drive shaft and a second of the three elements coupled to the shaft of the pump, wherein said three elements are rotatably movable about an axis of the epicyclic gear reducer and said drive device further comprises at least a first electrical motor arranged to drive in rotation a third of said elements of the epicyclic gear reducer to modify a rotational speed ratio between the drive shaft and the shaft of the pump.

11. The fuel supply system according to claim 10, wherein the drive device comprises a second electrical motor coupled to one of the first or second of said three elements of the epicyclic gear reducer, the first electrical motor and the second electrical motor arranged to transfer electrical power reversibly from each other.

12. The fuel supply system according to claim 9, wherein the flow rate loop is carried out by a first control unit and the pressure loop is carried out by a second control unit.

13. The fuel supply system according to claim 9, wherein the pressure loop is carried out faster than the flow rate loop.

* * * * *